Nov. 11, 1941.  A. M. GOODLOE  2,262,455
FABRICATED RESILIENT PAD OF METTALLIC FIBROUS OR MESH MATERIAL
Filed Nov. 28, 1939  2 Sheets-Sheet 1
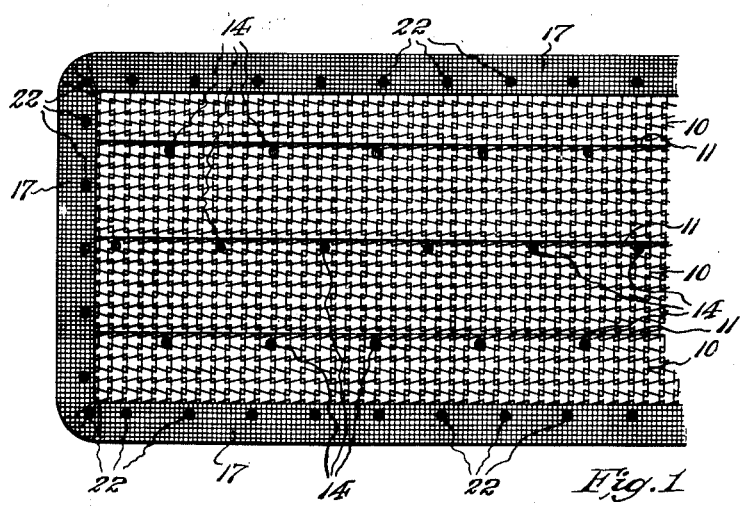
Fig.1
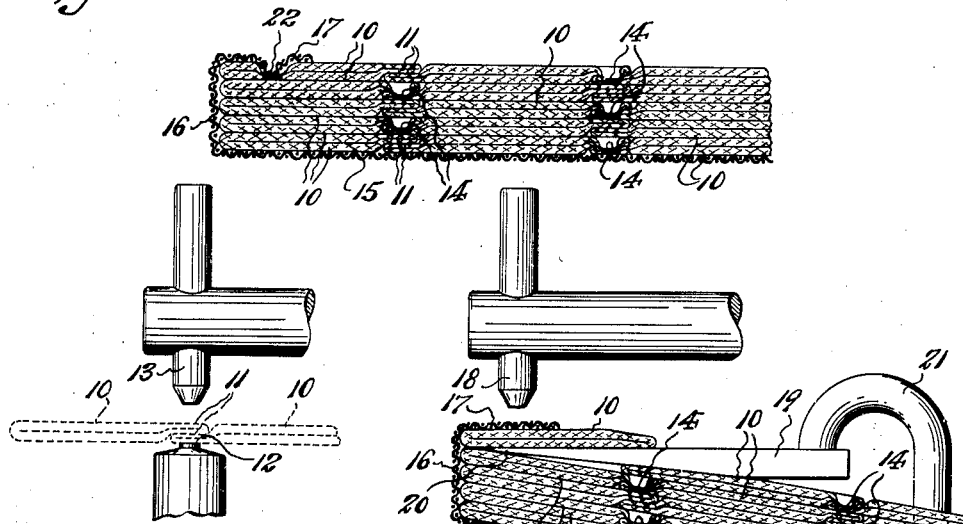
Fig.2
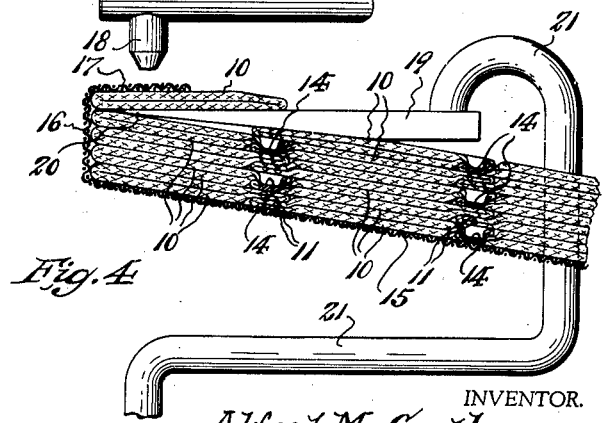
Fig.3
Fig.4
INVENTOR.
Alfred M. Goodloe,
BY George D. Richards
ATTORNEY.

Nov. 11, 1941.   A. M. GOODLOE   2,262,455
FABRICATED RESILIENT PAD OF METTALLIC FIBROUS OR MESH MATERIAL
Filed Nov. 28, 1939    2 Sheets-Sheet 2
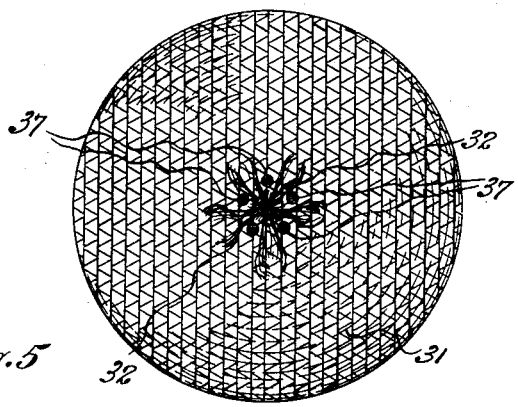
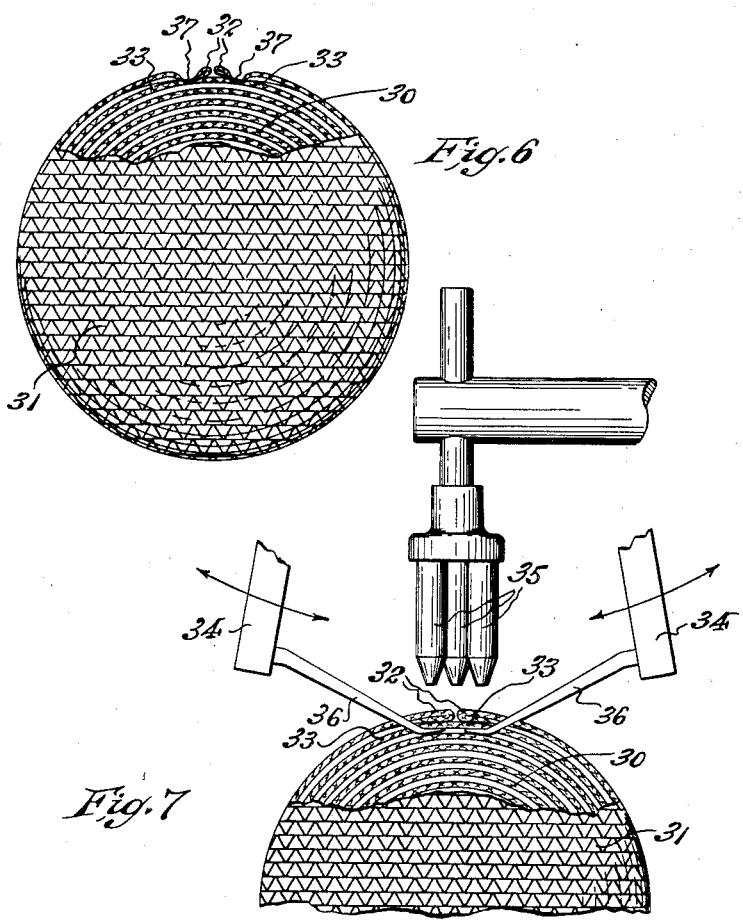
INVENTOR.
Alfred M. Goodloe,
BY George D. Richards
ATTORNEY.

Patented Nov. 11, 1941

2,262,455

UNITED STATES PATENT OFFICE 2,262,455

FABRICATED RESILIENT PAD OF METALLIC FIBROUS OR MESH MATERIAL

Alfred M. Goodloe, Montclair, N. J., assignor to Metal Textile Corporation, West Orange, N. J., a corporation of Delaware Application November 28, 1939, Serial No. 306,451

5 Claims. (Cl. 15—209)

This invention relates to resilient pads and other resilient or flexible bodies made from metallic fibrous or mesh material, and method of producing the same.

Resilient pads made of metallic fibrous or mesh materials are adapted for various uses. For example, pads of such character are employed as cushioning facings for ironing boards, pressing machine bucks and rolls, and the like; pads of metallic fibrous or mesh materials have also been made for use as scouring devices; and such pads and padding are adapted for many other purposes requiring provision of a resilient or yieldable foraminous mass.

In fabricating such pads or padding from metallic fibrous or mesh materials, it is usually the case that a body thereof of desired thickness or mass must be made up of a plurality of elements, as e. g. a plurality of layers, plies, strips or separate pieces of the metallic fibrous or mesh materials, which are assembled and secured together into a body shape suitable for the particular purpose desired to be served by the resultant pad. In assembling the plurality of elements making up the pad body, and thereupon securing said elements together in required relation, if separate applied mechanical fastening devices are employed, such e. g. as staples, rivets, wire stitching or the like, these fastening devices tend to form hard spots throughout the pad body which not only impair the uniform resiliency of the latter, but would, in many cases, form protuberances which undesirably roughen the exterior surface of the pad. Furthermore, accidental loosening or detachment of such applied fastening devices would frequently result in protrusion thereof from the pad surface, with risk of injury to materials applied to the pad surface in use, where e. g. the padding is used as a resilient support for materials as in laundry and pressing apparatus; or with risk of scratching the surfaces over which the pad is rubbed, where e. g. the pad is used as a scouring device.

This invention has for an object to provide a metallic fibrous or mesh pad body assembly in which the above mentioned objections are avoided, and to this end to provide a method of pad body assembly wherein the elements making up the same are secured together in desired relation by spot welds formed from the metallic fibrous or mesh material itself.

The invention has for another object to provide a metallic fibrous or mesh pad body wherein the assembled elements are secured together by spot welds of minimum mass and of comparatively soft porous character so as to avoid formation of hard spots or nodules; and wherein such spot welds are so located and distributed as to avoid any substantial interference with or obstruction of the maximum resilient play of the pad in use; and, furthermore, wherein such spot welds, and especially those adjacent to the exterior surface of the pad, are positioned below the plane of the pad surface, whereby all protuberant breaks in such surface are avoided.

Other objects of this invention, not at this time more particularly enumerated, will be understood from the following detailed description of the same.

Illustrative embodiments of this invention are shown in the accompanying drawings, in which:

Fig. 1 is a fragmentary plan view of a simple form of padding, made of metallic mesh material according to this invention for application to an ironing board, pressing buck or the like; Fig. 2 is an enlarged fragmentary vertical cross sectional view of the same; Fig. 3 is a fragmentary view of electric spot welding electrodes, to illustrate the use thereof in assembling and securing together elements making up the pad body by spot weld fastening means; and Fig. 4 is a fragmentary view of modified electric spot welding electrodes employed to secure a backing and binding member of metallic hardware cloth or mesh to the pad body by spot weld fastening means.

Fig. 5 is a top end view of a metallic mesh scouring pad, the exterior or cover plies of which are secured to and in covering relation to the interior mass of the pad by spot weld fastening means; Fig. 6 is a side elevation of the metallic mesh scouring pad of Fig. 5, showing spot welded parts thereof in section; and Fig. 7 is a fragmentary view of electric spot welding electrodes for applying the fastening spot welds to said scouring pad.

Similar characters of reference are employed in the hereinabove described views, to indicate corresponding parts.

A pad or padding, such as shown in Fig. 1, and adapted for use as a surfacing for ironing boards and like supports, in one very satisfactory form thereof, comprises a body made up of a plurality of lengths of knitted metallic fabric. The lengths of knitted fabric, which are preferably tubular knit but which may be flat knit, are flattened into strips, rolled into rovings, or otherwise formed to desired cross-sectional shape, and are thereupon arranged in side by side lapped relation to form a sheet or ply; or several strips, rovings or the like may be interwoven, braided or otherwise interengaged to form composite strips, which composite strips are thereupon arranged in side by side lapped relation to form a sheet or ply.

For the purpose of simplicity of illustration, the pad or padding sheets or plies shown in Figs. 1 to 4 inclusive of the drawings are each formed of flattened tubular knit strips 10; adjacent strips being arranged side by side with their meeting marginal portions 11 overlapping.

To secure the strips 10 together, the overlapping portions 11 thereof are subjected to a spot welding operation. This spot welding operation may be carried out by any suitable type of welding apparatus, but is preferably done by electric welding means including a fixed electrode 12 and an opposed vertically movable electrode 13.

In carrying out the welding operation to assemble and secure the strips 10 together to form the same into a sheet or ply of length and width conforming in area to the surface area of the pad to be formed, the lapped marginal portions 11 of adjacent strips are disposed over the fixed welding electrode 12 and beneath the movable electrode 13 (see Fig. 3), whereupon the latter is brought down upon the strips so as to fuse the interposed lapped material thereof into a spot weld 14. The strips are shifted longitudinally and said welding operations are repeated at intervals throughout the length of the lapped strips, thus firmly joining the latter together by a plurality of longitudinally spaced spot welds 14. Succeeding strips are in like manner welded to the assembly, until a sheet or ply of desired width is obtained. Preferably the spot welds 14 are disposed in staggered disposition so as not to be in symmetrical relation, and so that the spot welds of one sheet do not fall into vertical alignment with a contiguous underlying sheet, when a plurality of sheets are superimposed one upon another in pad body forming relation. Owing to the foraminous character of the metallic material subject to welding, the fusing of the metal in forming the spot welds will not produce a solid weld mass, but one which is of more or less porous character, and consequently of soft and somewhat flexible character, thus avoiding hard-spot formations, while at the same time offering little if any impedance to the resilient flexing play of the metallic material, so that the resilient efficiency of the finished pad body is unimpaired.

In order to build up the pad body to a desired thickness, a plurality of sheets, thus formed from assembled and secured strips of metallic mesh material, are superimposed, whereafter a metallic mesh base and binding fabric is assembled and secured thereto, so as to bind, retain and support the sheets in desired pad body forming relation. The base and binding fabric may be made of any suitable metallic mesh material, the base portion thereof, however, is preferably made of square woven metallic mesh, such e. g. as hardware cloth. The base and binding fabric is suitably arranged to provide a base portion 15 to underlie the pad body, and a binding portion 16 to extend upwardly over and around the marginal portions of said pad body, with free marginal sections 17 of said binding portion inturned to overlie the marginal areas of the top exterior surface of the pad body. The binding portion is then secured to the pad body by spot welding its marginal sections 17 to the underlying top sheet or ply of the pad body. The latter welding operations are carried out by means of specially formed and arranged welding electrodes including a vertically movable upper electrode 18 and a lower stationary horizontally projected electrode 19. This stationary electrode 19 is of wedge-like form tapering toward its free end portion 20, which latter portion is aligned beneath the movable electrode 18. Said stationary electrode 19 is suitably supported by an offsetting bracket arm 21, so that operative application and manipulation of the work relative to said stationary electrode may be readily accomplished.

In carrying out the operations of welding the binding portion sections 17 to the underlying portion of the top layer or ply of the pad body, the tapered extremity of the stationary electrode 19 is inserted beneath the outermost strip 10 of the top sheet or ply of the pad body, at a point intermediate spot welds whereby said outermost strip is joined to the next strip inwardly adjacent thereto. In this manner, the free end portion 20 of said stationary electrode 19 is positioned beneath that portion of the outermost strip 10 of the top sheet or ply of the pad body over which the marginal section 17 of the binding portion 16 is imposed. With the stationary electrode 19 thus disposed, the movable electrode 18 is brought down upon the thus interposed metallic mesh material so as to fuse the same into a spot weld 22. These operations are repeated at intervals around the marginal portions of the pad body until the binding portion is thereby firmly secured thereto by a series of spaced spot welds 22.

It will be understood that the spot welds 14 and 21, being formed as they are by but a small quantity or mass of fused metallic material of which the mesh is composed, consist in reality of relatively thin porous disk-like spots which are somewhat countersunk below the surfaces of the outlying metallic mesh material. By reason of this, and because of their spaced asymmetrical distribution throughout the interior as well as along the surface of the formed pad body, said spot welds neither offer impairing resistance to the desired resilient reaction of the pad body, nor do they form, especially at the exposed exterior surface of the pad body, surface interrupting protuberances, roughness or hard spots, and yet, notwithstanding these desirable advantages, the same nevertheless provide strong and durable fastening means for holding the elements making up the pad body in secured together assembled relation.

While I have illustratively described the pad body as made up of strip formed sheets or plies of metallic mesh material, it will be also understood that in place thereof the strips or the entire sheets may comprise strips or bats of fibrous metallic material, such e. g. as metallic wool, and elements formed from such material may be secured together by spot welds in the manner described, and may also be provided with backing and binding members of woven or knitted metallic mesh likewise secured thereto by spot welds substantially in the manner described.

Pads of metallic mesh or fibrous material to serve as scouring devices may also be made up in substantially similar manner to that above described in connection with the production of the resilient pressure sustaining padding referred to, except that the devices would be of small size, especially when designed for hand manipulation. On the other hand, scouring pads of the kind disclosed in U. S. Patent No. 1,683,357 to Kingman may also be made in accordance with this invention so as to embody the principles thereof, a scouring pad of this kind being shown in Figs. 5 to 7 of the accompanying drawings. In such embodiment of this invention, the pad involved comprises a resilient body of substantially bell-like shape. This pad body is made from a length of tubular knit metallic mesh twisted together intermediate its ends to provide a fixed restricted portion to divide the same into two sections, one section being suitably folded upon itself to form a central core 30, and the other section being folded exteriorly around said core to form a cover member 31, the open free end of which is gathered and closed together over an underlying portion of the core, all as disclosed in the aforesaid Kingman Patent No. 1,683,357. Pursuant to the principles of this invention, the gathered and closed together portions 32 of the cover member 31 are secured and held in place by spot welding the same to underlying ply or plies 33 of the core 30. The welding operations required for such purposes are carried out by means of suitably formed and arranged welding electrodes, including one or more oscillatable lower electrodes 34 and one or more vertically movable upper electrodes 35 to cooperate therewith. If one each of said upper and lower electrodes are employed, a series of suitably located spot welds may be successively formed by shifting the work relative to said electrodes. Preferably, however, a plurality of suitably spaced spot welds are simultaneously made in one operation by providing a plurality of radially disposed sets of cooperating electrodes, as shown in Fig. 7. In the latter case, the work is positioned in the path of movement of the initially outwardly swung lower electrodes 34, which include suitably shaped and directed tapered arms 36, so that the extremities of these arms, as the electrodes 34 are inwardly swung to operative work engaging position, may penetrate the mesh of the cover member 31 and of the adjacent ply or plies 33 of the core 30, to thereby engage and support portions of these parts in aligned opposition to the corresponding upper vertically movable electrodes 35. With the electrodes thus set for operation, the upper vertically movable electrodes 35 are caused to descend upon the interposed metallic mesh material so as to fuse the same into the porous, thin disk-like spot welds 37, thereby securing the cover against displacement from the core, while at the same time providing an integral incorporated fastening means of small mass and of non-hard-spot character, the same being located below the plane of the exterior surface of the pad, thus affording the desired advantages already adverted to.

It will be understood that all matter contained in the above description or shown in the accompanying drawings is intended to be interpreted as illustrative and not in a limiting sense.

I claim:

1. A resilient pad body made of metallic mesh fabric comprising, a plurality of superposed mesh fabric sheets, each sheet being composed of a plurality of suitably formed mesh fabric sections arranged in side by side lapped relation having their lapped portions fused together at intervals by thin, porous dish-like spot welds.

2. A resilient pad body made of metallic mesh fabric comprising, a plurality of superposed mesh fabric sheets, each sheet being composed of a plurality of suitably formed mesh fabric sections arranged in side by side lapped relation having their lapped portions fused together at intervals by thin, porous disk-like spot welds, and a binding of metallic mesh fabric enveloping the marginal portions of the thus formed pad body having spaced portions thereof united to a contiguous underlying sheet of the pad body by similar thin disk-like spot welds.

3. A resilient pad body made of metallic mesh fabric comprising, a plurality of superposed mesh fabric sheets, each sheet being composed of a plurality of suitably formed mesh fabric sections arranged in side by side lapped relation having their lapped portions fused together at intervals by thin, porous disk-like spot welds, said spot welds being asymmetrically distributed throughout the mass of the pad body thus formed.

4. A resilient pad body comprising a pile of assembled sections of metallic mesh fabric, superposed portions of contiguous sections being fused together at intervals by thin, porous disk-like spot welds, and said spot welds being asymmetrically distributed throughout the thickness of said body.

5. A resilient pad body comprising a pile of assembled sections of metallic mesh fabric, superposed portions of contiguous sections being fused together at intervals by thin, porous disk-like spot welds, said spot welds being asymmetrically distributed throughout the thickness of said body, and a binding of metallic mesh fabric enveloping the marginal portions of the thus formed pad body having edge portions thereof united to contiguous underlying parts of the body by similar thin disk-like spot welds.

ALFRED M. GOODLOE.